United States Patent
Gobius Du Sart et al.

(10) Patent No.: US 12,024,627 B2
(45) Date of Patent: Jul. 2, 2024

(54) PROCESS FOR MANUFACTURING PARTICLES COMPRISING POLYLACTIC ACID

(71) Applicant: PURAC BIOCHEM B.V., Gorinchem (NL)

(72) Inventors: Gerrit Gobius Du Sart, Gorinchem (NL); Siebe Cornelis De Vos, Gorinchem (NL); Taco Pascal Van Doorn, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 1385 days.

(21) Appl. No.: 16/478,843

(22) PCT Filed: Jan. 31, 2018

(86) PCT No.: PCT/EP2018/052379
§ 371 (c)(1),
(2) Date: Jul. 17, 2019

(87) PCT Pub. No.: WO2018/141781
PCT Pub. Date: Aug. 9, 2018

(65) Prior Publication Data
US 2019/0359819 A1    Nov. 28, 2019

(30) Foreign Application Priority Data

Feb. 2, 2017   (EP) .................................. 17154402

(51) Int. Cl.
| | | |
|---|---|---|
| *C08L 67/04* | (2006.01) | |
| *C08J 3/00* | (2006.01) | |
| *C08J 3/12* | (2006.01) | |
| *C09K 8/68* | (2006.01) | |
| *E21B 43/267* | (2006.01) | |
| *B29B 9/06* | (2006.01) | |
| *B29K 67/00* | (2006.01) | |
| *D01D 5/06* | (2006.01) | |

(52) U.S. Cl.
CPC .............. *C08L 67/04* (2013.01); *C08J 3/005* (2013.01); *C08J 3/12* (2013.01); *C09K 8/68* (2013.01); *E21B 43/267* (2013.01); *B29B 9/06* (2013.01); *B29K 2067/046* (2013.01); *C08L 2205/025* (2013.01); *C08L 2205/12* (2013.01); *D01D 5/06* (2013.01); *D10B 2331/041* (2013.01)

(58) Field of Classification Search
CPC ....................................................... C08L 67/04
See application file for complete search history.

(56) References Cited

U.S. PATENT DOCUMENTS

| | | | | |
|---|---|---|---|---|
| 5,317,064 A | * | 5/1994 | Spinu | C08L 67/04 525/413 |
| 2008/0207840 A1 | * | 8/2008 | Sodergard | C08L 67/04 525/415 |
| 2010/0056751 A1 | * | 3/2010 | Toyohara | C08G 63/912 528/354 |
| 2011/0201710 A1 | | 8/2011 | Kim et al. | |
| 2012/0202944 A1 | * | 8/2012 | Ochiai | C08K 5/0008 525/450 |
| 2014/0205836 A1 | | 7/2014 | Hidrot et al. | |

FOREIGN PATENT DOCUMENTS

| | | | |
|---|---|---|---|
| CN | 101712763 A | 5/2010 | |
| CN | 102924891 A | 2/2013 | |
| EP | 2 116 575 A1 | 11/2009 | |
| EP | 2 135 887 A1 | 12/2009 | |
| EP | 2 471 864 A1 | 7/2012 | |
| EP | 2 746 318 A1 | 6/2014 | |
| EP | 3 048 240 A1 | 7/2016 | |
| JP | 2005-290257 A | 10/2005 | |
| JP | 2013-252694 A | 12/2013 | |
| JP | 2014-520019 A | 8/2014 | |
| WO | 2011/024693 A1 | 3/2011 | |
| WO | 2015/055516 A1 | 4/2015 | |
| WO | 2015/187631 A1 | 12/2015 | |
| WO | WO-2016102163 A1 * | 6/2016 | ......... B29C 45/0001 |

OTHER PUBLICATIONS

Apr. 7, 2023 Office Action issued in Russian Patent Application No. 202290745/28.

(Continued)

*Primary Examiner* — Robert C Boyle
(74) *Attorney, Agent, or Firm* — Oliff PLC

(57) ABSTRACT

A process for manufacturing particles including a stereocomplex of poly-D-lactide (PDLA) and poly-L-lactide (PLLA), including the steps of: extruding a melt including 30-70 wt. % of PDLA and 70-30 wt. % of PLLA through an sc-PLA formation zone in a twin-screw extruder, wherein the formation zone is operated at a barrel temperature above the melting temperature of the PDLA and PLLA and below 220° C.; wherein the sc-PLA formation zone is followed by a finishing zone which is operated at a barrel temperature below 160° C.; wherein the finishing zone is followed by the end of the extruder which has a die-head resistance of 0; and recovering solid stereocomplex particles from the end of the extruder. The stereocomplex particles find use in various applications, e.g., in fracking fluids, as filler, as nucleating agent, in particular in the molding of semi-crystalline PLA, or as a starting material for the manufacture of sc-PLA products.

8 Claims, No Drawings

(56) References Cited

OTHER PUBLICATIONS

Aug. 6, 2020 Office Action issued in Japanese Patent Application No. 2019-541541.
Apr. 7, 2021 Office Action issued in Jpaanese Patent Application No. 2019-541451.
Arias et al., "Homocomposites of Polylactide (PLA) with Induced Interfacial Stereocomplex Crystallites," ACS Sustainable Chemistry & Engineering, 2015, vol. 3, pp. 2220-2231.
Tsuji, Hideto, "Poly(lactide) Stereocomplexes: Formation, Structure, Properties, Degradation, and Applications," Macromolecular Bioscience, 2005, vol. 5, pp. 569-597.
Apr. 20, 2018 International Search Report issued in International Patent Application No. PCT/EP2018/052379.

* cited by examiner

PROCESS FOR MANUFACTURING PARTICLES COMPRISING POLYLACTIC ACID

The present invention pertains to a process for manufacturing particles comprising polylactic acid.

Poly(lactic acid) or polylactic acid or polylactide (PLA) is a biodegradable thermoplastic aliphatic polyester derived from lactic acid. Due to the chiral nature of lactic acid, several distinct forms of polylactide exist, namely poly-L-lactide (PLLA), which is the product resulting from polymerization of L-lactide and poly-D-lactide (PDLA), which is the product resulting from polymerization of D-lactide. Copolymers of L-lactide and D-lactide yield PLA polymers with reduced melting points and slower crystallization kinetics.

Upon proper mixing of PLLA and PDLA, co-crystallization can result in a specific racemic crystal type called stereocomplex polylactic acid (sc-PLA). This particular type of PLA generally shows increased melting ranges that practically lie 40-50° C. higher than their respective parent homopolymers, viz. around 220-240° C. It is noted here that sc-PLA can also result from melt blending of PLA copolymers, albeit with reduced melting points compared to an sc-PLA made from PLLA and PDLA.

In this case, the different copolymers do still require high (opposite) stereochemical purities. In practice such sc-PLA blends made of PLA copolymers will show melting ranges between 180-220° C. It is furthermore understood that also small amounts of chemically different comonomers will still allow for PLA stereocomplex co-crystallization.

As such, PLLA and PDLA, as used throughout this text, are meant to include copolymers of lactides which still allow sc-PLA formation.

Stereocomplexes of PLLA and PDLA have been described for use in the recovery of liquid and gaseous hydrocarbons. Reference is made to EP3048240 (Toray Industries). The higher heat of fusion of the stereocomplex compared to standard PLA types in the market makes it highly attractive for this application. In this document, one of PLLA and PDLA has a weight average molecular weight of 50-300 kg/mol, while the other has a weight average molecular weight of 10-200 kg/mol. The polymer blend preferably is in the fiber form, in particular in the form of short fibers having a length of 1-5 cm and a fineness of 100-1000 dtex, or a length of 1-10 mm and a fineness of 0.3-5 dtex. The use of particles is also mentioned. The stereocomplex can be obtained by various polymerization and mixing reactions.

EP2746318 (Total Research) describes a method for manufacturing a PLLA/PDLA stereocomplex polymer comprising the steps of polymerizing L-lactide to obtain PLLA, polymerizing D-lactide to obtain PDLA, and mixing the PLLA and PDLA in an extruder in the presence of a supercritical fluid, thereby preparing a PLLA/PDLA stereocomplex polymer, and optionally removing the supercritical fluid from the stereocomplex. The product is extruded through a die to form strands, which are then cut to form pellets. It seems that the presence of supercritical fluid results in increased formation of stereocomplex by virtue of increased segmental mobility in the melt. A disadvantage of the method described herein is the use of a supercritical fluid, which results in a complicated process with high investment cost, due to the high pressure requirements and complicated operation.

EP2116575 (Teijin Limited et al.) describes a method for producing polylactic acid with a high molecular weight, in particular above 100 kg/mol, by the steps of kneading together PLLA and PDLA at a temperature of 160-225° C. and crystallizing the kneaded product, followed by melt-kneading the obtained solid. It is indicated that the step of kneading together PDLA and PLLA can be carried out using a twin-screw extruder or a kneader. In the examples, a laboratory-size PPK kneading extruder of Imoto Seisakusho Co. Ltd. was used, with a residence time of about 10 seconds. This reference provides no information as to how this process can be carried out on a commercial scale.

There is a need in the art for a process for manufacturing particles comprising a high content of polylactic acid stereocomplex, in particular particles with a mean volume diameter [4.3] below 2 mm, in particular below 1 mm, more specifically below 0.75 mm. These particles have many uses. For example, they can be beneficially used in aqueous suspensions used for the recovery of liquid and gaseous hydrocarbons from subterranean rock.

There is a need in the art for a process for manufacturing such particles which can be carried out in an efficient manner in commercially available polymer processing equipment. The present invention provides such a process that allows production of sc-PLA particles on industrial-scale.

The invention pertains to a process for manufacturing particles comprising a stereocomplex of poly-D-lactide (PDLA) and poly-L-lactide (PLLA), comprising the steps of extruding a melt comprising 30-70 wt. % of PDLA and 70-30 wt. % of PLLA through an sc-PLA formation zone in a twin-screw extruder, wherein the sc-PLA formation zone is operated at a barrel temperature of above the melting temperature of the PDLA and PLLA and below 220° C., wherein the sc-PLA formation zone is followed by a finishing zone, wherein the finishing zone is operated at a barrel temperature below 160° C., wherein the finishing zone is followed by the end of the extruder, wherein the end of the extruder has a die-head resistance of 0, and recovering solid stereocomplex particles from the end of the extruder.

It has been found that the process according to the invention makes it possible to obtain particles with a mean volume average diameter [4.3] below 1 mm, in particular below 0.75 mm, in an efficient and continuous manner, in an apparatus that can be obtained by modification of a conventional extruder. Further advantages of the present invention and specific embodiments thereof will become apparent from the further specification.

One decisive novelty of the process according to the invention is the possibility of dispensing with a grinding step for obtaining powders. The process allows a simple single-step conversion of typically 15-50 mg (2-5 millimeter-size) PLLA and PDLA polymer pellets to free-flowing, sub-millimeter sized stereocomplex PLA powder.

A feature of the present invention is that the extruder comprises an sc-PLA formation zone which is operated at a barrel temperature of above the melting temperature of the PDLA and PLLA and below 220° C. In the sc-PLA formation zone, the PDLA and PLLA are intimately mixed in the liquid phase under shear conditions, to initiate the formation of a stereocomplex. The use of a twin-screw extruder is also a feature of the invention, as this makes it possible to obtain the necessary intensive mixing conditions. The barrel temperature in the sc-PLA formation zone is between the melting temperature of the PDLA and PLLA and below 220° C. If the barrel temperature is too low, the PDLA and PLLA will be insufficiently molten to be able to form a stereocomplex. A barrel temperature of above 220° C. will be too high to result in the formation of stereocomplex particles. In the sc-PLA formation zone, the temperature of the material present therein generally is above the melting temperature of the PDLA and PLLA and below 220° C.

A further feature of the present invention is that the sc-PLA formation zone is followed by a finishing zone, which is operated at a barrel temperature below 160° C., and below the temperature of the sc-PLA formation zone. In the finishing zone, the temperature of the sc-PLA material is controlled, so that it is not above 220° C., which would detrimentally affect the properties of the particles to be formed.

A further feature of the present invention is that the extruder used in the present invention has a die head resistance at the end of the extruder of 0. Conventionally, extruders are provided with one (or more, depending on the number of barrels) extrusion dies with well-defined dimensions in the last part of the barrel, where the final material exits the extruder. Extrusion through a die results in the formation of strands, pipes, sheets, tapes, etc. In the specific case of polymer strands, commercial pelletizers or cutters are used to generate shaped particles. Extrusion dies result in a die head resistance of the order of several bars to hundreds of bars, depending on material flow properties, die geometry, extruder settings, etc. Typically a minimum of several bars of pressure is required to produce a stable extrudate and subsequently pellets of uniform shape and dimensions.

In the present invention it has been found that, contrary to the conventional manner of operating an extruder, no extruder die head should be mounted. The expectation in the art would be that this would result in a viscous polymer melt leaving the extruder, and that shaped particles can only be obtained when a die is used. Surprisingly it has now been found that in the specific situation of the present invention, the presence of a die (head) may result in occlusion of the die and jamming of the extruder operation, while in the absence of a die, i.e., at a die-head resistance of 0, a particulate material is obtained in a controlled and continuous manufacturing routine.

The present invention will be elucidated further below.

In the present invention, a melt is used with a specific composition. It comprises 30-70 wt. % of PDLA and 70-30 wt. % of PLLA, in particular 40-60 wt. % of PDLA and 60-40 wt. % of PLLA. It has been found that this relatively narrow range is essential to obtain particles with good properties. If this requirement is not met, the amount of resulting stereocomplex crystals may not be enough to result in a powder-forming product. It may be preferred for the melt to comprise 45-55 wt. % of PDLA and 45-55 wt. % of PLLA.

The PDLA and PLLA used in the present invention both generally have an absolute weight-average molecular weight of at least 20.000 g/mol, in particular at least 25.000 g/mol The upper limit may be relatively high, e.g., up to 200.000 g/mol. It may be preferred, however, for the molecular weight to be at most 100.000 g/mol, in particular at most 70.000 g/mol, more in particular at most 50.000 g/mol. These preferences can apply to either or both polymers. A low molecular weight is beneficial as it increases the kinetics of crystallization vital to the invention. Further, lower molecular weights result in lower viscosity, which results in less torque and thus may allow higher throughputs. This may be advantageous from a processing point of view. Further, the use of low molecular weight polymers may allow higher throughputs at the same settings. Polymers with a lower molecular weight have a higher degradation rate through hydrolysis. Depending on the potential application this may be a disadvantage or an advantage.

The molecular weight of the PDLA and PLLA used in the present invention may be the same or different.

Within the context of the present specification, the term molecular weight is intended to refer to the weight average molecular weight. Molecular weights may be determined using well-known Gel Permeation Chromatography (GPC) techniques using light scattering detection and HFiP (hexafluoroisopropanol) as the solvent and eluent, affording absolute molecular weight values such as the number-average (Mn) and weight-average (Mw) molecular weights.

The PDLA and PLLA used in the present invention have a high stereochemical purity. The PDLA consists for at least 70% of units derived from D-lactide. It is preferred for the PDLA to consist for at least 80% of units derived from D-lactide, in particular for at least 90%, more in particular for at least 95%. Conversely, the PLLA consists for at least 70% of units derived from L-lactide, preferably for at least 80%, in particular for at least 90%, more in particular for at least 95%. The reason for this preference is that the use of polymers with higher stereochemical purity results in a stereocomplex with higher peak melting point and higher heat of fusion.

The remainder of the PDLA and PLLA may comprise L-lactoyl units of the opposite stereochemistry (that is, L-lactoyl units derived from L-lactide monomers in the PDLA and D-lactoyl units derived from D-lactide monomers in the PLLA). Other monomers capable of polymerizing with lactide may also be present. Examples are glycolide and epsilon-caprolactone. It is preferred for the amount of non-lactide monomers to be below 20 wt. %, in particular below 15 wt. %, more in particular below 10 wt. %, even more in particular below 5 wt. %, especially below 2 wt. %

The PLA melt can be obtained in various manners. In one embodiment, the PDLA and PLLA are melted separately, and the melted compositions are combined and mixed, and provided to the sc-PLA formation zone. In another embodiment, the PDLA and PLLA are mixed in the solid phase, e.g., as polymer particles or powder, and then melted, with the melt being provided to the sc-PLA formation zone in the extruder.

In a preferred embodiment of the present invention, solid particles of PDLA and solid particles of PLLA are provided to a feeder zone of a twin-screw extruder, the combined PLA feed is melted in a melting zone in the extruder, and the resulting melt is provided to the sc-PLA formation zone in the extruder.

The feeder zone is the part of the extruder where the polymer is provided to the extruder. Where solid PDLA and PLLA are provided to the extruder, the feeder zone is generally operated at a barrel temperature below the melting point of the PDLA and PLLA. A suitable temperature may, e.g., be in the range of 10-100° C. If so desired, cooling may be applied, e.g., to apply a barrel temperature of 10-50° C.

The melting zone is defined as the zone at the beginning of which all polymer has been dosed to the extruder and at the end of which all polymer has melted. The temperature in the melting zone is not critical, as long as it results in full melting of the PDLA and PLLA. In general, the barrel temperature of the extruder in the melting zone will be between the melting temperature of the PDLA and PLLA, and below 220° C. At the end of the melting zone, the material has a temperature between the melting temperature of the PDLA and PLLA, and below 220° C.

The residence time in the melting zone is not critical, as long as the original polymers are fully melted at the end of the zone. DSC analysis can be used, for example, to determine whether original PLLA or PDLA crystals are present in the product. As a general range a value between 5 seconds and 10 minutes may be mentioned.

The melting zone generally has an L/D ratio of 5-20. It preferably comprises screws with a modular assembly of screw elements configured for conveying, pressure build-up and kneading and mixing. If so desired, a temperature profile applied, starting, e.g., from a feed zone with a temperature of 10-50° C., e.g., a water-cooled feed zone, and increasing in subsequent downstream barrel segments to values above the melting point of the polymer. As will be evident to the skilled person, the screw geometry can be adapted to address the changes in material properties associated with converting the material from solid pellets to a viscous melt.

The sc-PLA formation zone is the part of the extruder where the majority of the sc-PLA formation occurs. In the sc-PLA formation zone, the barrel temperature is kept at a temperature above the melting temperature of the PDLA and PLLA and below 220° C.

If the barrel temperature is below the melting temperature of the PDLA and PLLA, no proper melt-mixing will occur. Melt-mixing is important for the process, because stereocomplex PLA formation involves co-crystallization of individual PLLA and PDLA polymer chains. If the barrel temperature is above 220° C., stereocomplex crystallization will not occur at a significant rate, because the melt temperature is too close to the melting range of sc-PLA and too far above its crystallization temperature. The melting points of the PDLA and PLLA as defined above are typically between 150 and 180° C. It may be preferred for the barrel temperature in the sc-PLA formation zone to be at least 170° C., in particular at least 180° C. It may be preferred for the barrel temperature in the sc-PLA formation zone to be at a temperature of at most 210°, in particular at most 200° C., more in particular at most 195° C. For the temperature of the product in the sc-PLA formation zone the same ranges apply as given above for the barrel temperature, for the same reasons.

The residence time in the sc-PLA formation zone generally is at least 10 seconds. It has been found that it is difficult to obtain a high-quality product when the residence time is less than 30 seconds. It may be preferred for the residence time to be at least 1 minute. In general, the residence time in the sc-PLA formation zone is less than 15 minutes, more in particular less than 10 minutes. Longer residence times are generally not required to obtain a suitable product.

The sc-PLA formation zone is defined as the part of the extruder which starts at the point where all PDLA and PLLA has melted and which ends at the point where the barrel temperature is set to a value below 160° C.

In general, the sc-PLA formation zone has an L/D ratio of at least 6. The L/D ratio generally is at most 30. If the L/D ratio is below 6, it will be difficult to obtain a high quality sc-PLA product, as mixing may be insufficient. An L/D ratio of at least 10 may be preferred. On the other hand, an L/D ratio of more than 30 generally does not add to the quality of the product.

In the sc-PLA formation zone intimate mixing between the melted PDLA and the melted PLLA is aimed for, because otherwise a stereocomplex will not be formed. It may therefore be preferred to equip the extruder with mixing elements, in particular elements which provide efficient distributive mixing in order to homogenize the PLLA and the PDLA in the melt. In order to promote mixing, the extruder screw(s) in this section generally contain mixing elements, as known to those skilled in the art. Mixing elements can contain arrays of so-called kneading blocks, assembled under 30, 45 or 90 degrees angle and of various width. Back-pumping rather than forward-conveying mixing elements may be used, just like tooth gear elements, are other commercially available screw elements specially designed to promote homogenization.

The sc-PLA formation zone is followed by a finishing zone. In the finishing zone, the barrel temperature is below 160° C. In the finishing zone, the formation of sc-PLA is completed, and the particles are formed. The barrel temperature in the finishing zone is relatively low as compared to the barrel temperature in the sc-PLA formation zone. This is to ensure that crystallization can occur and solid particles are formed. The barrel temperature in the finishing zone may be, e.g., below 140° C., in particular below 120° C., more specifically below 100° C. In general, the barrel temperature in the finishing zone will be above 20° C.

The temperature of the material in the finishing zone will be below 220° C., in particular below 200° C. This allows proper formation of sc-PLA particles, which will not take place above this temperature. In general, at least at the beginning of the finishing zone, the material will have a temperature of more than 100° C., in particular more than 120° C., more in particular above 150° C., as it is derived from the sc-PLA formation zone. The material temperature at the end of the finishing zone will generally below 200° C. It may be much lower, e.g., below 100° C., but it may also be relatively high, e.g. above 150° C.

This will depend on the length of the finishing zone, and the temperatures applied.

In the finishing zone it may be attractive to apply a temperature gradient, wherein the barrel temperature at the beginning of the finishing zone, where it is connected to the sc-PLA formation zone, is higher than the barrel temperature at the end of the finishing zone, i.e., at the end of the extruder. This makes for a smooth transition between the zones.

The finishing zone generally has an L/D ratio of at least 3.

If the finishing zone is too short, the properties of the powder may be less attractive. It may be preferred for the finishing zone to have an L/D ratio of at least 6. The use of a finishing zone with an L/D ratio above 30 is believed not to bring additional benefit.

It may be attractive to provide comminuting elements in the extruder finishing zone, so as to reduce the particle size of the sc-PLA formed.

It is noted that the relationship between the barrel temperature and the material temperature may not be very direct. This applies in particular in the finishing zone. This is because the temperature of the material is determined not only by the barrel temperature, but also by the heat transfer from the barrel to the material, which is less effective in the finishing zone, and by the energy provided by other sources, e.g., the screw rotation and the exothermal sc-PLA formation reaction. Nevertheless, the barrel temperature is an effective manner to control the process.

The nature of the twin-screw extruder is not critical to the present invention. Both co-rotating and counter-rotating twin-screw extruders can be used. Of course, extruders with more than two screws can also be used, if so desired.

The total L/D of the extruder generally is in the range of 20 to 60, in particular 23 to 50. A larger L/D ratio will afford more capacity for detailed temperature control, but at the same time negatively impacts the investment in equipment.

A general range for the throughput of the method according to the invention may be 5-5000 kg/hour, depending on extruder configuration. A general range for the rpm may be in the range of 20-1200 rpm, depending on extruder configuration.

Particles comprising a stereocomplex of poly-D-lactide (PDLA) and poly-L-lactide (PLLA) are recovered from the end of the extruder without a die head. The particles generally have a particle size distribution which is such that at the particle mean volume diameter is below 2 mm, in particular below 1 mm, more in particular below 0.75 mm.

The Particle Size Distribution (PSD) can be determined with a Malvern Particle Sizer 3000 laser diffraction apparatus at 1 bar pressure. In cases where samples are too polydisperse or coarse to be measured directly, homogenized samples can be fractionated by sieving and the results of analyses of the different fractions can then be combined numerically. D[0.5] is the median of the volume-based particle diameters. It is preferred for the particles of the present invention to have a D[0.5] in the range of 50 to 1500 micrometer, in particular in the range of 100 to 750 micrometer, e.g., in the range of 150 to 500 micrometer.

D[0.90] is the intercept at 90 vol. % of the particle size distribution. That is, 90% of the particle volume is present in particles with a diameter below this value. It is preferred for the particles of the present invention to have a D[0.90] of at most 2 mm, in particular at most 1 mm.

D[0.10] is the intercept at 10 vol. % of the particle size distribution. That is, 10% of the particle volume is present in particles with a diameter below this value. It is preferred for the particles of the present invention to have a D[0.10] of at most 0.4 mm, in particular at most 0.2 mm.

D[4.3] stands for the volume mean diameter. It is preferred for the particles of the present invention to have a D[4.3] of below 2 mm, in particular below 1 mm, more in particular below 0.75 mm.

These parameters are conventional in the field of determining particle size distributions, and are readily generated by conventional apparatuses.

The particle size distribution of the powders can be influenced by selecting the extrusion conditions such as throughput, screw design and screw speed. As indicated above, temperature control and mixing efficiency is also important to obtain the correct particle size.

In a preferred embodiment, the stereocomplex PLA particles obtained by the process according to the invention in essence show a single melting peak. This is the melting peak of stereocomplex PLA which ranges between 195 and 250° C. The heat of fusion detected in a typical 1st heating scan at 10K/min using differential scanning calorimetry (DSC) is at least 20 J/gram, in particular at least 30 J/gram and can go up to 100 J/gram. Independent of the exact value for the heat of fusion of the sc-PLA peak, it is preferred for the sc-PLA powder produced according to the invention to have essentially no melting peaks below 150° C. that would be assigned to lower melting PLA, PLLA or PDLA. It is preferred for the sc-PLA powder produced according to the invention to have essentially no melting peaks below 160° C. that would be assigned to lower melting PLA, PLLA or PDLA, in particular below 180° C. With 'essential' it is meant that less than 10 J/g of melting enthalpy is observed below the specified temperature.

It is possible to add further components to the extruder for incorporation into the particles, in addition to the PDLA and PLLA.

Examples of further components include UV-stabilisers, anti-oxidants, crystallization nucleating agents, plasticizers, waxes, mineral fillers, anti-hydrolysis agents like BioAdimide, reactive chain extenders, cross-linkers, or other polymers, hydrolysis promoting strong acids or bases, etc. It is preferred to keep the content of additional components limited, to prevent interference with the formation of the stereocomplex particles. More specifically, it may be preferred that the amount of other components, if used, is less than 20 wt. %, in particular less than 10 wt. %, in some embodiments less than 5 wt. %.

If the products are to be used in the oil and gas industry, it may also be desired to limit the presence of further components, to avoid bringing undesirable components into the environment. It is one of the advantages of the particles of the present invention that they consist of a (bio)degradable material.

The invention also pertains to particles comprising a stereocomplex of poly-D-lactide (PDLA) and poly-L-lactide (PLLA), which have a mean volume diameter [4.3] below 2 mm, in particular below 1 mm and more in particular below 0.75 mm, and a D[0.5] above 50 micron, the particles having a single melting peak between 195 and 250 degrees Celsius and a heat of fusion of at least 20 J/gram, which are believed to be novel and inventive. The preferences indicated above for the product obtained by the process of the invention also apply to these particles. It is preferred for these particles to be obtained by or obtainable by the process of the present invention.

The stereocomplex particles of the present invention can be used in various ways, as such or after having been subjected to a particle size reduction step. For example, if so desired, the product obtained from the extruder can be subjected to further comminuting steps, e.g., (cryogenic) milling or grinding. Sieving can also be applied to select a fraction with a suitable particle size distribution.

In one embodiment, the particles are used in fracking fluids used in the recovery of oil and/or gas, in particular shale oil and/or shale gas through hydraulic fracturing. They can be used, e.g., in diverting fluids, as channelant, and/or as proppant. Fracking processes are known in the art and require no further elucidation here.

In another embodiment, the particles are used as filler, for example in self-reinforced composites.

Yet another embodiment of the use of the particles is as nucleating agent for PLA homocrystallization. As traditional PLA grades are typically melt processed at temperatures below the melting point of the particles of the invention, the particles will remain as persistent crystals in PLA compounds and as such will act as nucleating agents for the PLA matrix crystallization.

In a further embodiment, the stereocomplex particles can be used as a starting material for the manufacture of sc-PLA products. In one embodiment, the stereocomplex particles are used as starting material in a gel-spinning process, to manufacture highly oriented sc-PLA fibers. For example, in a first step sc-PLA particles are combined with a suitable liquid to make a suspension, optionally followed by high shear mixing to obtain a paste. The suspension or paste are extruded to form a homogeneous gel which is then extruded through a spin head into a coagulation bath from which the fibers can be taken up for further processing like drying and hot drawing to obtain the final sc-PLA fibers.

It will be clear to the skilled person that various preferred embodiments of the present invention can be combined, unless they are mutually exclusive.

The present invention will be illustrated by the following examples, without being limited thereto or thereby.

Example 1: Manufacture of Sc-PLA Powder (I)

A starting PDLA (Luminy™ D070, Corbion) was selected with an absolute weight-average molecular weight of 45 kg/mol, and a melt flow index of 12 g/10 min (ISO 1133-A, 190° C./0.325 kg). The stereochemical purity was >99% (D-isomer) and the melting point was 175° C. (DSC).

A starting PLLA (Luminy™ L105, Corbion) was selected with an absolute weight-average molecular weight of 65 kg/mol, and a melt flow index of 22 g/10 min (ISO 1133-A, 190° C./2.16 kg). The stereochemical purity was >99% (L-isomer) and the melting point was 175° C. (DSC).

The two materials were provided in a 1:1 ratio to the gravimetric feeder of a Berstorff 400 rpm ZE40A-38D co-rotating twin-screw extruder. Temperature settings of the extruder barrel were as shown in the scheme below. Z1 is the feeding zone. Melting takes place in Z2-Z3. The majority of the sc-formation takes place in Z4-Z5, and Z6 through Z8 make up the finishing zone. Screw rotation speed was set at 70 rpm and the throughput rate was about 40 kg/h. The torque level during stable operation was 60-70%. The L/D values for the respective zones were as follows: Z1: L/D is 4; Z2-Z3: L/D is 10; Z4-Z5: L/D is 10; Z6-Z8: L/D is 14. Total L/D was 38.

| | Zone | | | | | | | | |
|---|---|---|---|---|---|---|---|---|---|
| | Feed Z1 | Z2 | Z3 | Z4 | Z5 | Z6 | Z7 | Z8 | Die Z9 |
| Barrel Temperature set value (° C.) | 40 | 120 | 195 | 195 | 195 | 160 | 100 | 100 | NA |
| Actual barrel temperature values (° C.) | 39 | 117 | 198 | 186 | 194 | 154 | 114 | 100 | NA |

The temperature of the collected sc-PLA powder leaving the extruder barrel was approximately 170° C. At the end of the extruder, no die was present. The end of the extruder had a die-head resistance of 0. Material temperature in zones Z3-Z8 was between 170° C. and 220° C.

A particulate product was recovered from the end of the extruder. The white, free-flowing powder had the following particle size distribution: D [4,3]=430 micron, D [0.1]=102 micron, D [0.5]=330 micron and D [0,9]=896 micron. Thermal characterization using DSC (scanning rate 10K/min) showed a single melting point at 231° C. with a melting enthalpy of 73 J/g. (See DSC graph overlay in FIG. 1)

Example 2: Manufacture of Sc-PLA Powder (II)

A similar powder production was realized as in Example 1, in the same extruder with identical throughput (40 kg/h) and screw speed (70 rpm) and the same PLLA/PDLA granulate mixture. The temperature settings were adjusted and shown in the scheme below. Material temperature in zones Z3-Z8 was between 170° C. and 220° C.

| | Zone | | | | | | | | |
|---|---|---|---|---|---|---|---|---|---|
| | Feed Z1 | Z2 | Z3 | Z4 | Z5 | Z6 | Z7 | Z8 | Die Z9 |
| Barrel Temperature set value (° C.) | 40 | 120 | 195 | 195 | 195 | 140 | 50 | 50 | NA |
| Actual barrel temperature values (° C.) | 38 | 119 | 210 | 188 | 192 | 147 | 108 | 70 | NA |

Under these settings, a powder produced with the following characteristics: D [4,3]=469 micron, D [0.1]=101 micron, D [0.5]=354 micron and D [0,9]=996 micron. The DSC thermograph (scanning rate 10K/min) confirmed the existence of just a single melting peak at 231° C.

Comparative Example 1: Conventional Blend Strands

As in Example 1, a blend of 50% Luminy™ D070 and 50% Luminy™ L105 was fed to the twin-screw extruder of Example 1 at a feed rate of 20 kg/h and a screw speed of 227 rpm. Now the extrusion zones were set to the temperature scheme below and a conventional double-strand die head was mounted.

| | Zone | | | | | | | | |
|---|---|---|---|---|---|---|---|---|---|
| | Feed Z1 | Z2 | Z3 | Z4 | Z5 | Z6 | Z7 | Z8 | Die Z9 |
| Barrel; Temperature set value (° C.) | 60 | 120 | 195 | 215 | 215 | 215 | 205 | 205 | 230 |
| Actual barrel temperature values (° C.) | 57 | 120 | 200 | 211 | 214 | 215 | 203 | 204 | 228 |

This classical compounding operation proceeded in a steady state at a torque of 15% and produced a homogeneous, clear polymer melt with temperature of 237° C. The viscous melt did not crystallize and as a result, a conventional transparent double strand was extruded. This example shows that too high (material) temperatures and the presence of a die do not constitute the proper conditions for continuous manufacture of sc-PLA powder.

Comparative Example 2: Extruder Blocks

Using the same materials and extruder set-up as in Comparative Example 1, the temperature settings below were now chosen.

| | Zone | | | | | | | | |
|---|---|---|---|---|---|---|---|---|---|
| | Feed Z1 | Z2 | Z3 | Z4 | Z5 | Z6 | Z7 | Z8 | Die Z9 |
| Temperature set value (° C.) | 60 | 120 | 195 | 195 | 195 | 175 | 170 | 165 | 160 |

A lower screw speed of 100 rpm had to be used, to prevent the mixture in the extruder from overheating and thus still leaving the extruder as a viscous polymer melt. An opaque melt was extruded from one of the two orifices of the die head, while the other orifice was jammed. At these settings, it could thus be shown that crystallization was incomplete and moreover resulted in a (partial) blocking of the extrusion die, and thus no feasible, continuous operation.

Example 3: Use as Hydrolytically Degrading Particles

To mimic the behavior of sc-PLA powder in fracking applications, the powder produced in Example 1 was subjected to hydrolytical degradation.

To this end, 12 grams of the powder were mixed in a 600 mL reactor (Parr Instrument Company Series 4760 General Purpose Vessel) with 200 mL of demineralized water. A nitrogen pressure of 7 bar was applied and the temperature was raised and maintained to 155° C. This temperature was chosen as it mimics a typical high temperature degradation profile as used in the fracking industry.

The experiment was allowed to run for 16 h, after which the remaining solid was filtered over Whatman #3 paper filter and was subsequently dried at 40° C. until constant weight. The mass loss of the powder was determined to be 82%. The sc-PLA powder as such shows higher hydrolytical degradation resistance than typical poly(L-lactide) powders, which consistently fully degrade under identical circumstances.

Example 4.: Use as Nucleating Agent

To test the use of the powder of Example 2 as nucleating agent, a compound was made of 5 wt. % of the powder and 95 wt. % Luminy™ L130 (Corbion). Using DSC analysis, the differences in crystallization behavior were analysed. Samples of both PLLA L130 and PLLA L130 with 5% of the powder of example 2 were subjected to the following DSC protocol: Equilibrate at 20° C., heat at 10K/min to 200° C., hold at 200° C. for 3 minutes and cool to 0° C. at 5K/min. In the case of the pure PLLA L130 sample, a very broad crystallization peak was observed, with about 12 J/g crystallinity being created. This indicates slow and incomplete crystallization from the melt. For the compound with 5% of the sc-PLA powder, a sharp crystallization peak was observed with a maximum at 110° C., forming about 37 J/g of crystals. This shows that the sc-PLA powder acts as a nucleating agent in crystallizable PLA compounds.

The invention claimed is:

1. Process for manufacturing particles comprising a stereocomplex of poly-D-lactide (PDLA) and poly-L-lactide (PLLA), comprising the steps of
   extruding a melt comprising 30-70 wt. % of PDLA and 70-30 wt. % of PLLA through an sc-PLA formation zone in a twin-screw extruder, wherein the sc-PLA formation zone is operated at a barrel temperature of at least 170° C. and below 220° C., for a residence time of at least 1 minute and not more than 10 minutes, and at an L/D ratio of at least 10 and not more than 30,
   wherein the sc-PLA formation zone is followed by a finishing zone, wherein the finishing zone is operated at a barrel temperature below 160° C.,
   wherein the finishing zone is followed by the end of the extruder, wherein the end of the extruder has a die-head resistance of 0, and
   recovering solid stereocomplex particles from the end of the extruder.

2. Process according to claim 1, wherein the melt comprising 30-70 wt. % PDLA and 70-30 wt. % PLLA is obtained by the steps of providing solid particles of PDLA and solid particles of PLLA to a feeder zone of the extruder, and melting the PDLA and PLLA in a melting zone in the extruder located prior to the sc-PLA formation zone.

3. Process according to claim 1, wherein the melt comprises 40-60 wt. % PDLA and 60-40 wt. % PLLA.

4. Process according to claim 1, wherein the barrel temperature in the sc-PLA formation zone is at least 170° C. and at most 210° C.

5. Process according to claim 1, wherein the finishing zone is operated at a barrel temperature below 140° C.

6. Process according to claim 1, wherein the solid stereocomplex particles have a particle size distribution which is such that its mean volume diameter is below 2 mm.

7. Process according to claim 1, wherein the solid stereocomplex particles show a single melting peak between 195 and 250 degrees Celsius.

8. Process according to claim 1 which further comprises one or more steps selected from milling, grinding, and sieving.

\* \* \* \* \*